Patented Aug. 31, 1954

2,688,042

UNITED STATES PATENT OFFICE 2,688,042

CARBONYLATION OF MIXED OLEFINS

Philip Geoffrey Harvey, Norton-on-Tees, England, assignor to Imperial Chemical Industries Limited, a corporation of Great Britain No Drawing. Application December 28, 1949, Serial No. 135,540

Claims priority, application Great Britain January 26, 1949

8 Claims. (Cl. 260—597)

This invention relates to the simultaneous carbonylation of mixtures of olefines of different molecular weights and has for its object to provide a simple technique by which higher conversions and yields can be achieved than with similar known techniques.

The terms "conversion" and "yield," as used in this specification, have the following meanings. Conversion is the molar percentage of feed material destroyed per pass through the reactor, based on the amount of feed material entering the reactor. Yield is the molar percentage of product per pass through the reactor based on the amount of feed material destroyed.

A carbonylation process is known in which an organic substance selected from the group which consists of the aliphatic and cyclic olefines is acted upon at elevated pressures and temperatures with carbon monoxide and hydrogen in the presence of a hydrogenation catalyst. It has already been proposed to apply this process to mixtures, co-injecting these into the reaction zone. The present invention proposes a certain modification of this technique.

It is also known that the conversions and yields achieved in the carbonylation reaction referred to can be considerably increased by maintaining the reactants substantially in the liquid or condensed phase. Such conditions have been attained by:

(a) Using a pressure sufficiently high (at the particular reaction temperature used) for the olefine itself to form this phase, (b) Using a long reaction time so that high boiling products form such a phase (when the pressures required for the olefine itself to form this phase are unobtainable or are not used, e. g., for economic reasons); using this method, however, adversely affects yields;

(c) Co-injecting an inert high boiling medium with the feed olefine (when the pressures required for the olefine itself to form the liquid phase are unobtainable or are not used, e. g., for economic reasons).

The present invention proposes to use an improved step of the general type (c), as applied to lower olefines, i. e. those olefines which, under the conditions of operation, are in the vapour phase to an extent detrimental to efficient carbonylation. If, for example, the process is carried out at 250 atmospheres, the olefines containing up to five carbon atoms would be among those indicated, the temperature required for reaction being in this case 100–190° C.

The invention is based on our discovery that the rate of reaction of such lower olefines is higher than that of a higher olefine such as di-isobutene. By a higher olefine we mean an olefine which under the conditions of operation is substantially in the liquid phase.

According to the invention, a process of simultaneous catalytic carbonylation of mixtures of olefines of different molecular weights comprises feeding a higher olefine or higher olefines with carbon monoxide and hydrogen to a reaction zone and so injecting a lower olefine or lower olefines into the reaction zone that the time of contact of the lower olefine or olefines with the catalyst is less than that of the higher olefine or olefines, so that the partly converted higher olefine or olefines acts or act as the liquid medium for the carbonylation of the lower olefine or olefines.

Additional inert liquid media, e. g., paraffinic hydrocarbons containing 12 carbon atoms, may be present, if desired.

The catalyst may be already present in the reaction chamber when the reactants are fed into it, or the catalyst may be fed into the reaction chamber together with the reactants, particularly when the catalyst is soluble in one or more of the reactants.

The process may be carried out continuously or batchwise as desired. If it is carried out continuously, the lower olefine or olefines may be injected into the reaction chamber at a point or at points intermediate the inlet for the higher olefine or olefines and the outlet from said chamber; if the process is carried out batchwise, the lower olefine or olefines is or are injected after the lapse of a suitable time interval or of suitable time intervals following the injection of the higher olefine or olefines.

For instance, at 250 atmospheres pressure and a temperature of 100–170° C. di-isobutene can be satisfactorily treated without a high-boiling medium to yield products of lower vapour pressure than the reactant. The addition of a lower olefine at an intermediate point in the reaction zone results in the utilisation of the partially converted higher olefine as the necessary liquid medium, and thus results in the products from both emerging at the end of the reactor at optimum conversion, other conditions of the reaction being suitably chosen.

Another advantage resulting from the use of the invention is that the heat of reaction, which is known to be high in the carbonylation of olefines, is spread over the reactor to a considerably better extent than when injecting the reactants together.

The mixed products are preferably withdrawn continuously, and are subjected to suitable treatments for hydrogenation and/or separation.

A variety of suitable catalysts may be used, the one at present preferred being a cobalt catalyst, either injected as a soluble salt or compound such as the naphthenate or carbonyl of cobalt, or as a solid cobalt compound injected as a slurry such as cobalt-thoria-kieselguhr, or supported in the reaction zone on a carrier.

Experiments were carried out to ascertain the relative rates of reaction of higher and lower olefines. A pressure of 250 atmospheres was used of a 3:1 molar parts hydrogen-carbon monoxide mixture at a temperature of 160° C. and a cobalt catalyst in the form of cobalt naphthenate in liquid feed at a concentration of 0.1% of cobalt. Under these conditions 80-85% conversion of olefine was achieved with di-isobutene at a space velocity of 0.5 litre of liquid olefine per litre of reaction space per hour, whereas the same conversion could be achieved with a mixture of equal volumes of propene and the paraffin containing 12 carbon atoms at a space velocity of 2.0 litres of liquid olefine per litre of reaction space per hour.

*Example 1*

Di-isobutene containing an amount of dissolved cobalt naphthenate giving 0.1% of cobalt in the solution, was fed to the bottom of a tubular reactor arranged for upward flow of reactants at a space velocity of 0.25 litre of liquid di-isobutene per litre of total reactor free space per hour, the reactor being maintained at 155 to 175° C. and at a pressure of 250 atmospheres. A gaseous mixture comprising 25% of carbon monoxide and 75% of hydrogen by volume was fed into the reactor at the same point at a space velocity of 500 litres of gas as measured at atmospheric pressure and temperature per litre of total reactor space per hour. The reaction of the di-isobutene to form oxygenated products was established, and after 2 hours propene was injected into the reactor at a point situated half-way up the reactor in such a manner that the propene flowed at a space velocity of 0.325 litre of liquid propene per litre of the upper half of the reactor free space per hour.

The combined carbonylation products derived from the di-isobutene and the propene were subsequently hydrogenated over a suitable catalyst.

Operating the process under the aforementioned conditions of temperature, pressure and space velocities resulted in a yield of di-isobutene to $C_9$ alcohol and higher boiling alcohols of 75%, and a yield of propene to normal and isobutanols of 75%, conversion of both olefines being greater than 90%. A liquid product of the following weight per cent composition was obtained from the entire process. $C_9$ alcohol 46%, butanols (normal and iso-) 33.5%, high boiling alcohols (boiling point above 200° C.) 6.0%, di-isobutene 2.5, iso-octane 12.0%.

Constituents other than alcohols may be separated from this product by a suitable technique, such as adding methanol which forms low-boiling azeotropes with the di-isobutene and iso-octane which can be readily removed as described in United States application Serial No. 160,831, filed May 8, 1950, followed by a simple distillation to separate individual alcohols.

*Example 2*

Using the same apparatus, technique and reaction conditions as in Example 1, ethene was substituted for propene at a rate of 120 litres ethene gas per litre of upper half reactor space per hour. After hydrogenation the liquid product had a composition (by weight): $C_9$ alcohol 42.5%, n-propanol 31.0%, high boiling alcohols (boiling point above 200° C.), 10%, di-isobutene 6.5%, and iso-octane 10%, representing a yield of di-isobutene to $C_9$ and higher alcohols of at least 70%, and of ethene to n-propanol of at least 65%. The conversions of both olefines were greater than 90%.

It will, as a general rule, be desirable that at least two of the carbonylation products of the olefines used should be capable of being separated by chemical or physical means, e. g. by straight distillation or by azeotropic distillation. This desideratum is fulfilled in the case of the above examples.

In the claims that follow, the term "olefinic material" is used to refer to a member of the group comprising an olefine and a mixture of olefines.

I claim:

1. A process of simultaneous catalytic carbonylation of olefines of different molecular weights, comprising feeding at least one higher olefine which is liquid under the conditions of the reaction with carbon monoxide and hydrogen to a reaction zone in the presence of a catalyst, partially reacting same and then injecting at least one lower olefine containing not more than five carbon atoms into said reaction zone so that the time of contact of the lower olefinic material referred to with said catalyst is less than that of the higher olefinic material referred to and the partly converted higher olefinic material acts as the liquid medium for the carbonylation of the lower olefinic material.

2. A continuous process as claimed in claim 1, in which the lower olefinic material is injected into the reaction zone at at least one point intermediate the inlet for the higher olefinic material and the outlet from said zone.

3. A batch process as claimed in claim 1, in which each portion of the lower olefinic material is injected into the reaction zone after a predetermined time interval following the injection of the higher olefinic material.

4. A process as claimed in claim 1, in which di-isobutene is used as a higher olefine.

5. A process as claimed in claim 1, in which ethene is used as a lower olefine.

6. A process as claimed in claim 1 in which propene is used as a lower olefine.

7. A process as claimed in claim 1, using a catalyst which is soluble in at least one of the reactants, in which said catalyst is fed to the reaction chamber in solution in at least one of the reactants.

8. A process as described in claim 1 in which the catalyst employed is a soluble compound of cobalt.

References Cited in the file of this patent

UNITED STATES PATENTS

| Number | Name | Date |
|---|---|---|
| 2,327,066 | Roelen | Aug. 17, 1943 |
| 2,415,102 | Landgraf et al. | Feb. 4, 1947 |
| 2,437,600 | Gresham | Mar. 9, 1948 |
| 2,464,916 | Adams et al. | Mar. 22, 1949 |
| 2,504,682 | Harlan, Jr. | Apr. 18, 1950 |
| 2,549,111 | Millendorf et al. | Apr. 17, 1951 |
| 2,557,701 | Smith | June 19, 1951 |
| 2,587,858 | Keulemans | Mar. 4, 1952 |